United States Patent [19]
Albertini et al.

[11] Patent Number: 5,845,952
[45] Date of Patent: Dec. 8, 1998

[54] STORAGE UNIT FOR PICKUP TRUCK

[76] Inventors: Rick Michael Albertini, 12708 Bailey St.; Paul Gerald Albertini, 12706 Bailey St., both of Whittier, Calif. 90601

[21] Appl. No.: 806,752

[22] Filed: Mar. 3, 1997

[51] Int. Cl.⁶ .................................................. B60N 3/12
[52] U.S. Cl. ...................... 296/37.6; 296/24.1; 296/100
[58] Field of Search .................... 296/24.1, 27, 37.1, 296/37.6; 224/42.42

[56] References Cited

U.S. PATENT DOCUMENTS

| | | | |
|---|---|---|---|
| 2,616,754 | 11/1952 | Stahl | 296/27 |
| 2,784,027 | 3/1957 | Temp | 296/23 |
| 2,978,153 | 4/1961 | Brindle | 224/42.42 |
| 3,245,713 | 4/1966 | Ogilvie | 296/24 |
| 3,727,971 | 4/1973 | Sisler | 296/37 R |
| 4,573,731 | 3/1986 | Knaack et al. | 296/376 |
| 4,705,317 | 11/1987 | Henri | 296/37.6 |
| 4,733,898 | 3/1988 | Williams | 296/24 R |
| 4,789,195 | 12/1988 | Fletcher | 296/37.6 |
| 5,088,636 | 2/1992 | Barajas | 224/281 |
| 5,593,201 | 1/1997 | Bateman | 296/100 |

*Primary Examiner*—Jesus D. Sotelo
*Attorney, Agent, or Firm*—Dunlap & Codding, P.C.

[57] ABSTRACT

A storage unit for a vehicle having a cargo bed defined by a floor and a plurality of side panels is provided. The storage unit includes a first upper cabinet, a first lower cabinet, a second upper cabinet, and a second lower cabinet. A floor plate is secured between the first and second lower cabinets so as to define a drawer receiving space beneath the floor plate. A drawer is slidably mounted in the drawer receiving space. A plurality of clamp assemblies are utilized to connect the first and second upper cabinets to the flange of the adjacent side panels of the vehicle such that the first and second upper cabinets, the first and second lower cabinets, and the drawer are removably secured to the vehicle without structurally altering the vehicle.

23 Claims, 5 Drawing Sheets

STORAGE UNIT FOR PICKUP TRUCK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to storage devices for use in pickup trucks, and more particularly, but not by way of limitation, to an improved storage unit for a pickup truck which provides a substantial amount of storage space and which is easily installed in and removed from a pickup truck without requiring the pickup truck to be structurally altered.

2. Brief Description of the Related Art

Pickup trucks and other vehicles having a cargo bed are widely used by plumbers, mechanics, contractors, and other individuals as service trucks. Pickup trucks are favored over other types of trucks in light of their maneuverability, relatively low cost and substantial cargo space. A problem experienced with the use of pickup trucks as service trucks, however, is that the cargo bed is not equipped to carry cargo such as tools and the like in a secure manner. Therefore, numerous storage units for use in the bed of a pickup truck have been previously proposed in an effort to make the cargo bed of a pickup truck more secure and to utilize the cargo bed of a pickup truck in a more efficient manner.

Although many of the prior art storage units have achieved varying degrees of success, problems have nevertheless been experienced with the use of such storage units. In particular, to secure the prior art storage units in the cargo bed of a pickup truck, the pickup truck must usually be altered structurally in some manner to accommodate the storage unit. Such alterations usually involve drilling holes through the bed floor or the side panels of the pickup truck for receiving a bolt which is utilized to secure the storage unit to the pickup truck or welding the storage unit to the pickup truck whereby the storage unit is permanently fixed to the pickup truck.

While connecting the storage unit to the pickup truck in this manner ensures the storage unit is secured in the bed of the pickup truck, structural alterations to a pickup truck generally have a detrimental effect on the resale value of a pickup truck. Further, there are many occasions when it would be desirable to remove the storage unit from the pickup truck. For example, many individuals use their pickup truck as both a service truck and a personal vehicle. In these instances, it is desirable to be able to remove the storage unit from the pickup truck on a regular basis and not have drill holes seen throughout the bed of the pickup truck. In other instances, a company may have a fleet of service trucks. As such, it is desirable to be able to easily transfer a storage unit from one truck to another should one of the trucks need service or repair.

To this end, an improved storage unit has long been needed which provides substantial storage space and which is quickly and easily installed in and removed from the cargo bed of a pickup truck without requiring structural alterations to the pickup truck. It is to such an improved storage unit that the present invention is directed.

BRIEF SUMMARY OF THE INVENTION

The present invention is directed to a storage unit for a vehicle having a cargo bed defined by a floor and a plurality of side panels, each side panel having a top end and a downward extending flange. The storage unit includes a first upper cabinet, a first lower cabinet, a second upper cabinet, and a second lower cabinet. A floor plate is secured between the first and second lower cabinets so as to define a drawer receiving space beneath the floor plate. A drawer is slidably mounted in the drawer receiving space. A plurality of clamp assemblies are utilized to connect the first and second upper cabinets to the flange of the adjacent side panels of the vehicle such that the first and second upper cabinets, the first and second lower cabinets, and the drawer are removably secured to the vehicle without structurally altering the vehicle.

The objects, features and advantages of the present invention will become apparent from the following detailed description when read in conjunction with the accompanying drawings and appended claims.

DETAILED DESCRIPTION OF THE INVENTION

Figure 1:
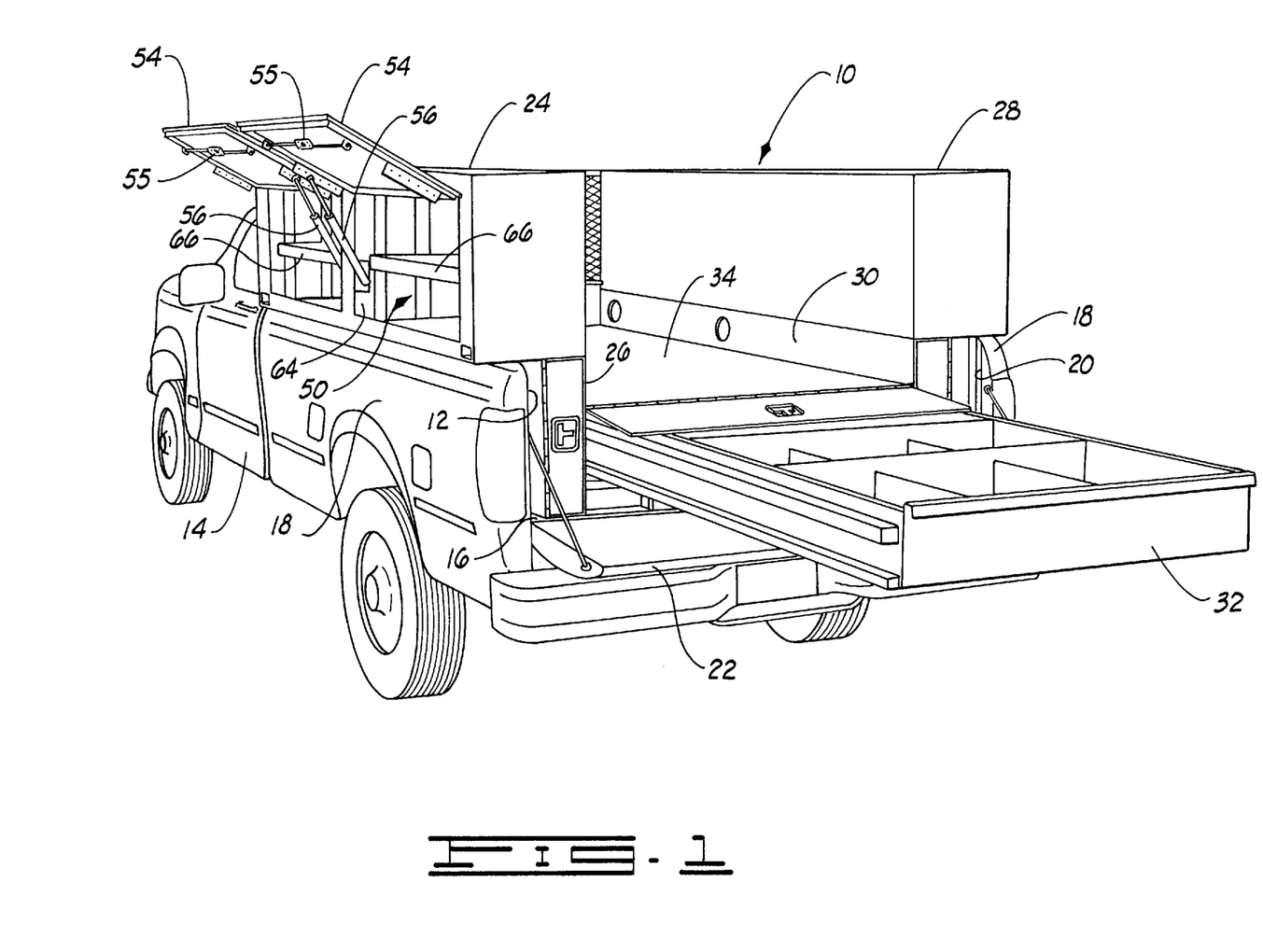
FIG. 1 is a perspective view of a storage unit constructed in accordance with the present invention shown mounted in a pickup truck.

Referring now to the drawings, and more particularly to FIG. 1, a storage unit 10 constructed in accordance with the present invention is shown installed in a cargo bed 12 of a pickup truck 14. The cargo bed 12 is defined by a floor 16 disposed between a plurality of upward extending side panels 18. The pickup truck 14 is further provided with a rear opening 20 for providing access to cargo bed 12 and a tailgate 22 for selectively opening and closing the rear opening 20.

Broadly, the storage unit 10 includes an upper cabinet 24, a lower cabinet 26, an upper cabinet 28, a lower cabinet 30, and a central drawer 32 positioned between the lower cabinets 26 and 30 and beneath a floor plate 34. The several components of the storage unit 10 are preferably formed of a heavy gauge steel, such as 16 gauge A-60 Jet Kote steel, and are interconnected in a suitable fashion, such as by welding, to provide a unitary body which is installed into and removed from the cargo bed 12 of the pickup truck 14 as a single unit.

Figure 2:
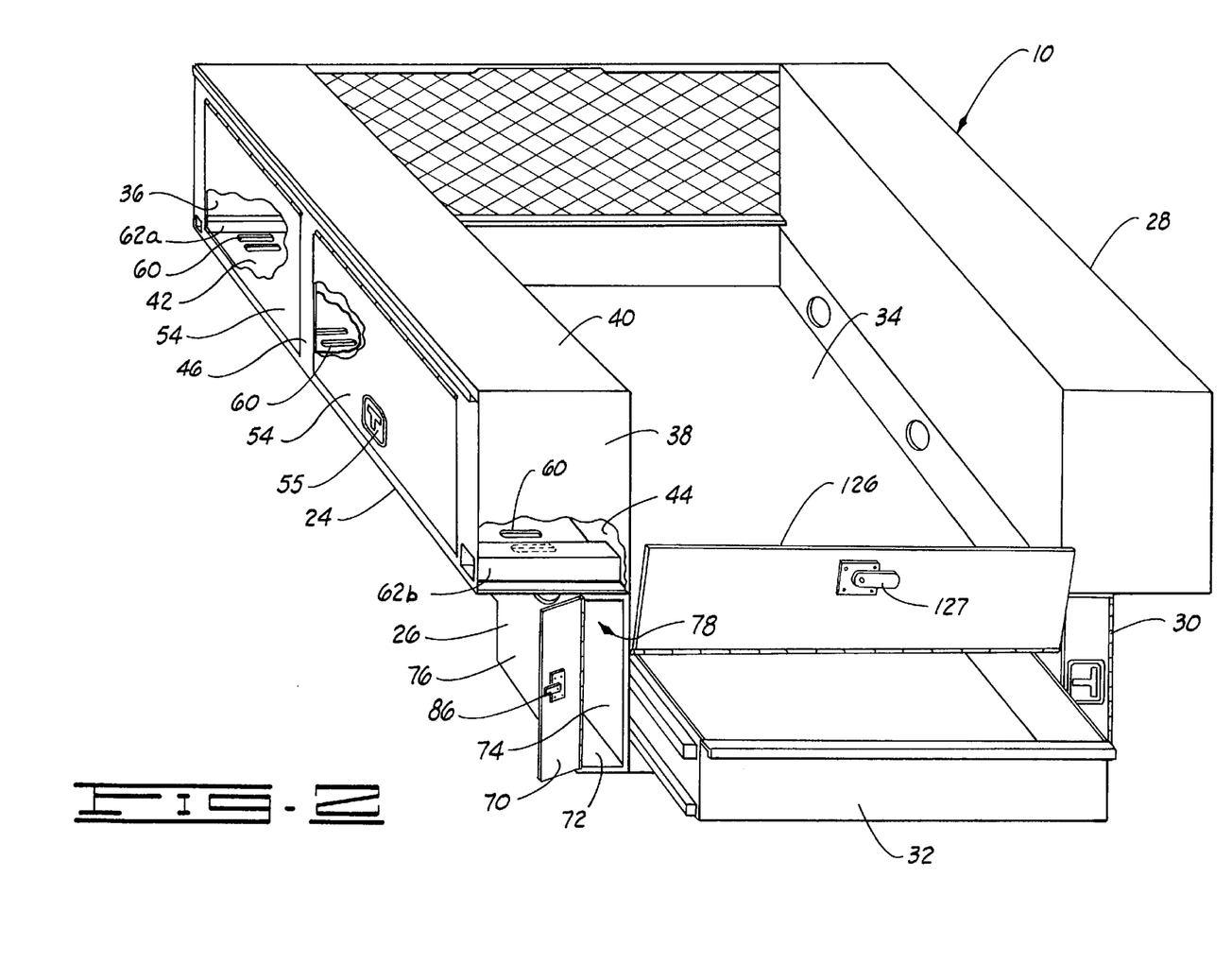
FIG. 2 is a partially cutaway, perspective view of the storage unit of the present invention.

Referring now to FIG. 2, the upper cabinets 24 and 28 are substantially identical in design and construction except for their right and left hand characteristics, as are the lower cabinets 26 and 30. Thus, only the upper cabinet 24 and the lower cabinet 26 will be described in detail hereinbelow.

Figure 4:
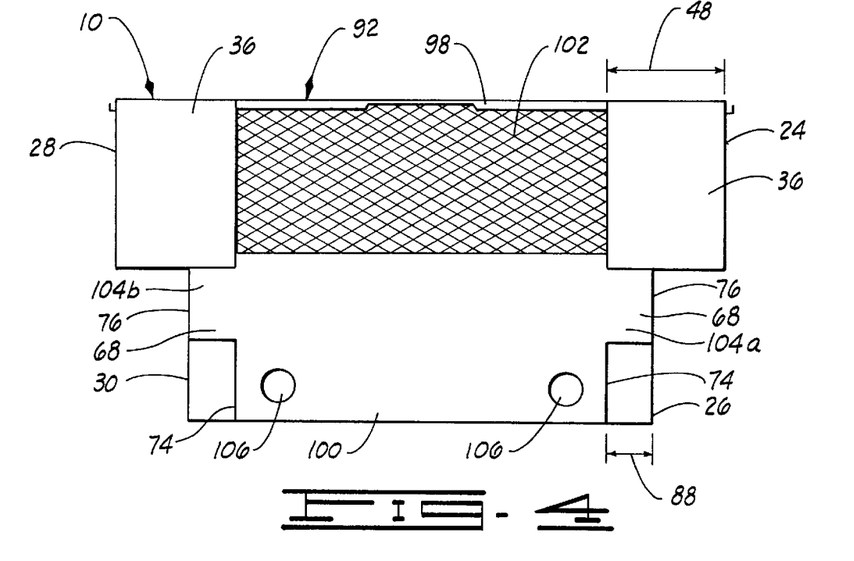
FIG. 4 is a front view of the storage unit of FIG. 2.

The upper cabinets 24 and 28 are preferably rectangularly shaped and include a front end panel 36, a rear end panel 38, a top panel 40, a bottom panel 42, an inner side panel 44, and an outer side panel 46. In a preferred construction, the top panel 40, the bottom panel 42, and the inner side panel 44 are fabricated from a single sheet of material. The upper cabinets 24 and 28 are characterized as having a width 48 (FIG. 4). Each of the panels 36–46 cooperates to define a cabinet space 50 (FIG. 1).

The outer side panel 46 of the upper cabinets 24 and 28 further have a pair of door openings for providing access to the cabinet space 50 and a pair of cabinet doors 54 hingedly connected to the outer side panel 46 for selectively opening and closing the door openings. Each of the cabinet doors 54 is provided with a lockable latch 55 (FIG. 1), and each is supported in an open position with a pneumatic door assist shock 56 (FIG. 1).

Figure 7:
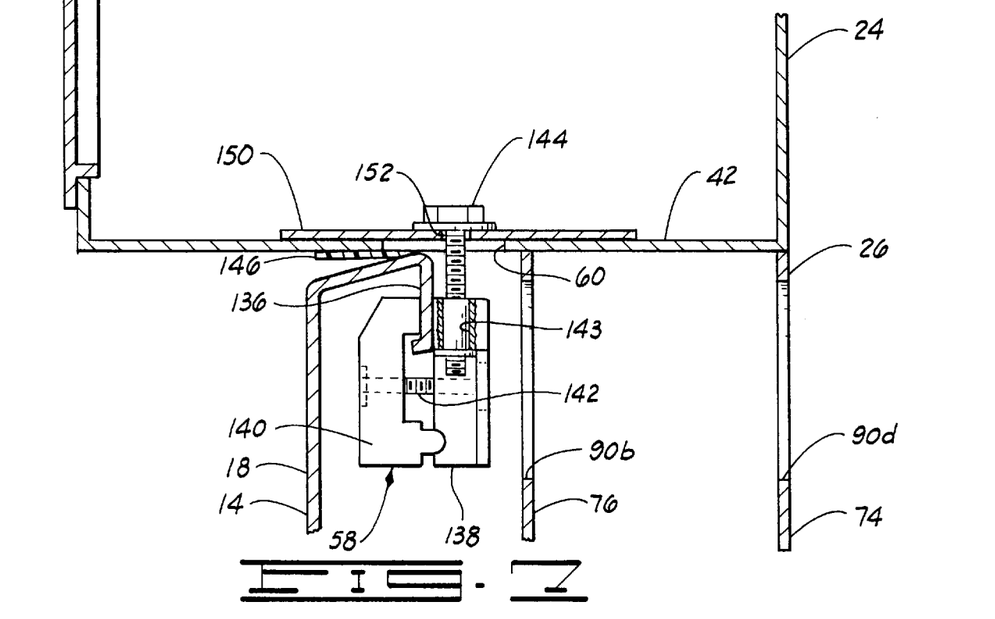
FIG. 7 is a partially cutaway, sectional view illustrating the use of a clamp assembly to secure the storage unit of the present invention to a side panel of the pickup truck.

As will be described in detail hereinbelow, the storage unit 10 is removably connected to the pickup truck 14 with a plurality of clamp assemblies 58 (FIG. 7). To facilitate mounting of the storage unit 10 to the pickup truck 14 with the clamp assemblies 58 (only one of the clamp assemblies 58 being shown in FIG. 7), the bottom panel 42 of the upper cabinets 24 and 28 is provided with three pairs of mounting slots 60. To facilitate positioning the storage unit 10 into the cargo bed 12 of the pickup truck 14 and removing the storage unit 10 from the cargo bed 12 of the pickup truck 14, the upper cabinets 24 and 28 are provided with a pair of support tubes 62a, 62b. The support tube 62a is disposed between the inner and outer side panels 44 and 46 adjacent the front end panel 36, while the support tube 62b is disposed between the inner and outer side panels 44 and 46 adjacent the rear end panel 38.

The upper cabinet 24 is shown in FIG. 1 to have a central divider 64 so as to form a pair of compartments with each compartment having an adjustable shelf 66. However, it will be appreciated by those of ordinary skill in the art that the interior of the upper cabinets 24 and 28 may be designed and constructed in various ways to accommodate different items, material, and equipment.

The lower cabinets 26 and 30 include a front end panel 68 (FIGS. 3 and 4), a rear end panel 70, a bottom panel 72, an inner side panel 74, and an outer side panel 76. The lower cabinets 26 and 30 are connected to the bottom panel 42 of the respective upper cabinets 24 and 28 such that the bottom panel 42 of the upper cabinet 24 and 28 cooperates with the front end panel 68, the rear end panel 70, the bottom panel 72, the inner side panel 74, and the outer side panel 76 of the lower cabinet 26 or 30 to define a cabinet space 78.

The lower cabinets 26 and 30 are designed to be positioned adjacent the side panels 18 (as substantially shown in FIG. 1) when the storage unit 10 is installed in the cargo bed 12 of the pickup truck 14. As such, FIG. 3 best shows that the bottom panel 72 of the lower cabinets 26 and 30 includes an upper section 79 and a lower section 80 with the upper and lower sections 79 and 80 being connected by a vertical section 82 to account for the tire wells (not shown) of the pickup truck 14. To this end, the outer side panel 76 is substantially L-shaped; however, the inner side panel 74 is rectangularly shaped whereby a portion of the inner side panel 74 extends below the upper section 79 of the bottom panel 72.

The lower cabinets 26 and 30 are provided with a door opening. The rear end panel 70 is hingedly connected to an adjacent edge of the outer side panel 76 to provide a cabinet door for selectively opening and closing the door opening. The rear end panel 70 is provided with a lockable latch 86.

Like the upper cabinets 24 and 28, the lower cabinets 26 and 30 are each characterized as having a width 88 (FIG. 4). The width 88 is less than the width 48 of the upper cabinets 24 and 28 and the lower cabinets 26 and 30 are connected to the upper cabinets 24 and 28 so that the inner side panel 44 of the upper cabinets 24 and 28 are coextensive with the inner side panel 74 of the respective lower cabinet 26 or 30. Thus, a portion of the bottom panel 42 of each of the upper cabinets 24 and 28 is positionable on the top end of the side panels 18 of the pickup truck 14 and the lower cabinets 26 and 30 are disposable within the cargo bed 12 of the pickup truck 14. The width 88 of the lower cabinets 26 and 30 is preferably substantially the same as the width of the tire wells (not shown) formed in the cargo bed 12 of the pickup truck 14 thereby enabling the area of the cargo bed 12 between the tire wells to be utilized when the storage unit 10 is installed therein.

Figure 3:
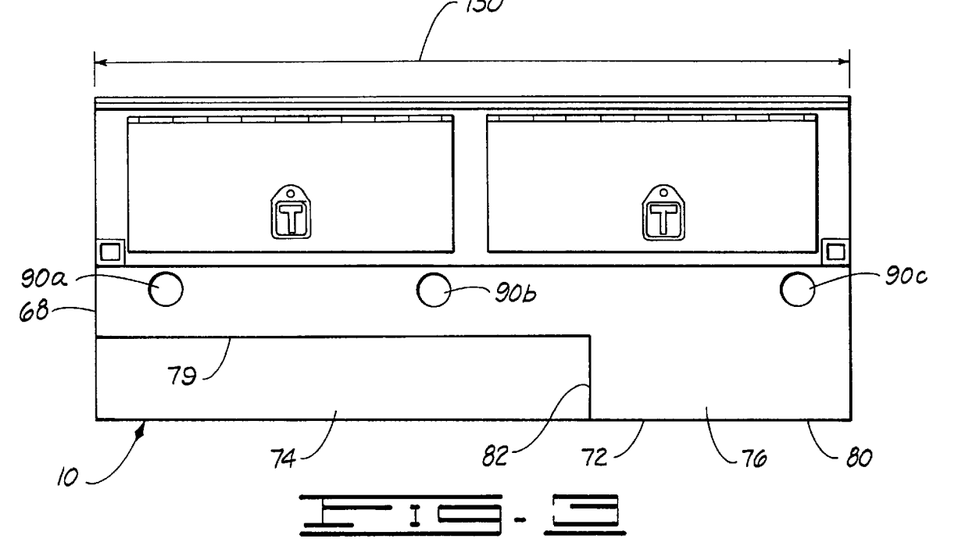
FIG. 3 is side view of the storage unit of FIG. 2.
Figure 5:
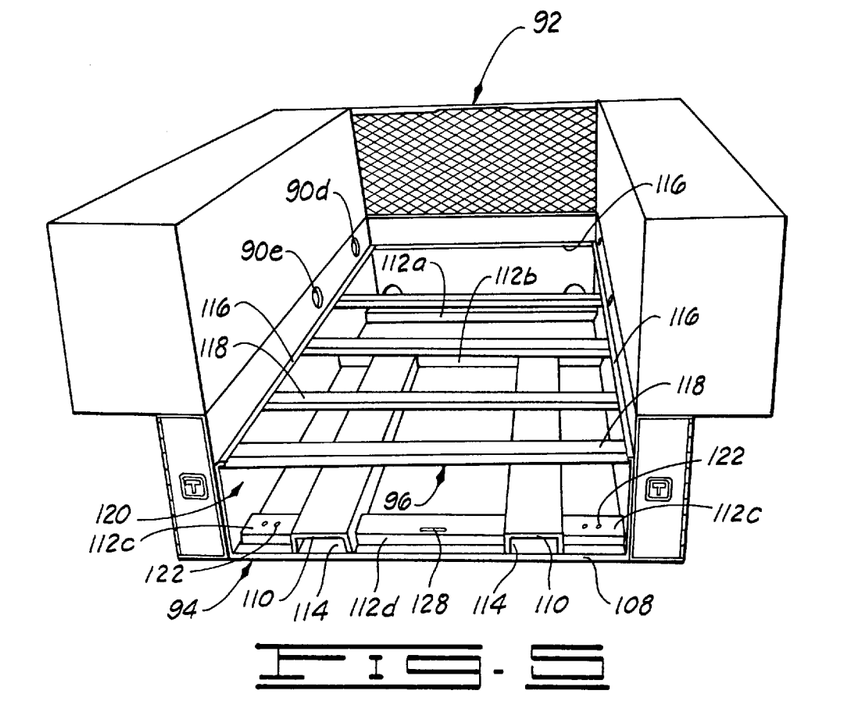
FIG. 5 is a perspective view of the storage unit of the present invention with the floor plate and the central drawer removed.

The lower cabinets 26 and 30 are further provided with a plurality of access openings 90a–e for installing the clamp assemblies 58 in a manner to be discussed below in reference to FIG. 7 and for permitting regular inspection of the clamp assemblies 58. As best shown in FIG. 3, the outer side panel 76 is provided with access openings 90a, 90b, and 90c. FIG. 5 shows the inner side panel 74 as being provided with access openings 90d and 90e with access opening 90d being in alignment with access opening 90a and access opening 90e being in alignment with access opening 90b. It will be understood that access to the clamp assembly 58 positioned adjacent to access opening 90c is gained via the rear end panel 70.

Referring now to FIGS. 4 and 5, the upper and lower cabinets 24 and 26 and the upper and lower cabinets 28 and 30 are joined together a predetermined distance apart with a bulkhead assembly 92, a base floor assembly 94, and a deck assembly 96. The bulkhead assembly 92 includes an upper support 98, a bulkhead 100, and a metal window screen 102. The upper support 98 is secured between the upper end of the front end panel 36 of the upper cabinets 24 and 28 thereby providing additional support to upper cabinets 24 and 28.

The bulkhead 100 is connected to the front end panel 36 of the upper cabinets 24 and 28, the outer side panel 76 of the lower cabinets 26 and 30, and the inner side panel 74 of the lower cabinets 26 and 30. The bulkhead 100 is provided with a pair of laterally extending portions 104a and 104b which serve as the front end panels 68 of the lower cabinets 26 and 30, respectively. The bulkhead 100 is further provided with a pair of access openings 106 near the lower end thereof.

The metal window screen 102 is secured to the upper support 98 and the bulkhead 100 and to the front end panel 36 of the upper cabinets 24 and 28.

As shown in FIG. 5, the base floor assembly 94 includes a plate member 108, a pair of fork receiving members 110, and a plurality of cross members 112a, 112b, 112c, and 112d.

The fork receiving members 110 are preferably channel members which are secured to the plate member 108 in a parallel, spaced apart relationship extending longitudinally along the plate member 108 from the rear end of the plate member 108. The fork receiving members 110 define a pair of fork receiving spaces 114 which facilitate installation and removal of the storage unit with a fork lift (not shown). The installation and removal of the storage unit will be described in greater detail below.

Cross members 112a–d are transversely connected to the plate member 108 substantially as shown in FIG. 5 to provide additional support to the plate member 108. The plate member 108 and the cross members 112a and 112b are secured to the lower end of the inner side panel 74 of the lower cabinets 26 and 30 and the plate member 108 is additionally secured to the lower end of the bulkhead 100.

The deck assembly 96 includes a plurality of perimeter support members 116, a plurality of cross members 118, and the floor plate 34 (FIG. 2). The support members 116 can be any material suitable for providing support, such as angle iron as shown herein. The cross members 118 are transversely extended between the support members 116 in a parallel, spaced apart relationship. The floor plate 34 (FIG. 2) is secured to the support members 116 so as to provide a cargo bed floor when the storage unit 10 is installed in the cargo bed 12 of the pickup truck 14. For safety purposes, the floor plate 34 is preferably provided with a diamond nonskid upper surface.

The inner side panels 74 of the lower cabinets 26 and 30, the bulkhead 100, the base floor assembly 94, and the deck assembly 96 cooperate to define a drawer receiving space 120 (FIG. 5) for receiving the central drawer 32 (FIG. 2).

The drawer 32 is characterized as an open top, rectangular receptacle. The drawer 32 is mounted in the drawer receiving space 120 for sliding movement between a closed position and an open position. The drawer 32 is shown in FIG. 1 to be provided with a plurality of dividers; however, it will be appreciated that the interior of the drawer 32 may be designed and constructed in various ways to accommodate different items, material, and equipment. To provide maximum storage, the drawer 32 is sized to extend the length of the drawer receiving space 120 when the drawer 32 is in the closed position.

The drawer 32 is slidably mounted in the drawer receiving space 120 with a pair of drawer slides 121; each mounted to a corresponding side of the drawer 32 and the cross members 112a and 112c. As shown in FIG. 5, the cross members 112c are each provided with a pair of slide mounting holes 122, and the cross member 112a is provided with two sets of slide mounting holes (not shown). The slide mounting holes of the cross members 112a and 112c are adapted to be aligned with corresponding mounting holes of the drawer slide 121 so that the drawer slides 121 may be fastened to the respective cross members 112a and 112c with a suitable connector member (not shown) disposed through the aligned mounting holes. A suitable drawer slide is commercially available from Kwikee Products Co., Inc, and sold under the trademark The 90" Super Slide®.

A rear door 126 (FIG. 2) is hingedly connected to rear end of the floor plate 34 for selectively opening and closing the drawer receiving space 120. The rear door 126 is provided with a latch member 127 selectively engagable with a slot 128 formed in the cross member 112d. The latch 127 may be provided with a keyed lock for securely retaining the drawer 32 in the closed position when desired.

Figure 6:
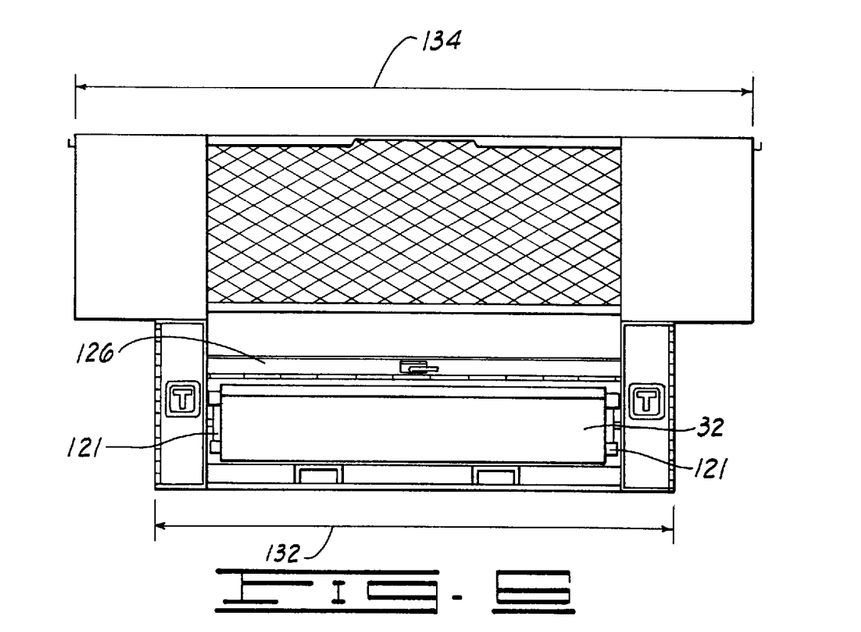
FIG. 6 is a rear view of the storage unit of the present invention.

When assembled, the storage unit 10 has a length 130 (FIG. 3); a lower width 132 (FIG. 6) extending from the outer side panels 76 of the lower cabinets 26 and 30; and an upper width 134 (FIG. 6) extending between the outer side panels 46 of the upper cabinets 24 and 28. The length 130 of the storage unit 10 is substantially the same as the length of the cargo bed 12 of the pickup truck 14 whereby the tailgate 22 may be raised and lowered in a conventional manner when the rear end panels 70 of the lower cabinets 26 and 30 and the central drawer 32 are in the closed positioned and the rear door 126 is closed. The lower width 132 and the upper width 134 are dimensioned such that the storage unit 10 fits in the cargo bed 12 of the pickup truck 14 with the upper cabinets 24 and 28 resting on the top end of the side panels 18 of the pickup truck 14 and the lower cabinets 26 and 30 positioned in the cargo bed 12 adjacent to the side panels 18.

As indicated above, the storage unit 10 is secured to the pickup truck 14 with the clamp assemblies 58 (only one clamp assembly 58 being shown in FIG. 7). The use of a clamp assembly, such as the clamp assembly 58, permits the storage unit 10 to be quickly and easily mounted to the pickup truck 14 and removed therefrom without requiring the pickup truck 14 to be structurally altered. As shown in FIG. 7, the clamp assemblies 58 are designed to be attached to a downward extending flange 136 of the side panels 18 of the pickup truck 14. A suitable clamp assembly is distributed by DAWS Manufacturing Co., Inc., Pensacola, Fla. and sold under the trademark GRIP RITE™. Each of the clamp assemblies 58 includes a first clamp portion 138 and a second clamp portion 140 adjustably connected to one another with a clamping bolt 142. The first clamp portion 138 is provided with a pair of bolt is receiving holes 143 (only one being visible in FIG. 7) for receiving a pair of mounting bolts 144 (only one being visible in FIG. 7). It will be appreciated that the mounting slots 60 formed in the bottom panel 42 of the upper cabinets 24 and 28 are spaced to receive the mounting bolts 144 of one of the clamp assemblies 58.

To install the storage unit 10 in the cargo bed 12 of the pickup truck 14, a rubber gasket material 146 (FIG. 7) is first applied to the lower side of the bottom panel 42 of the upper cabinets 24 and 28 (FIG. 7) to prevent the storage unit 10 from coming into direct contact with the top of the side panels 18 of the pickup truck 14. Next, the storage unit 10 is positioned in the cargo bed 12.

Figure 8:
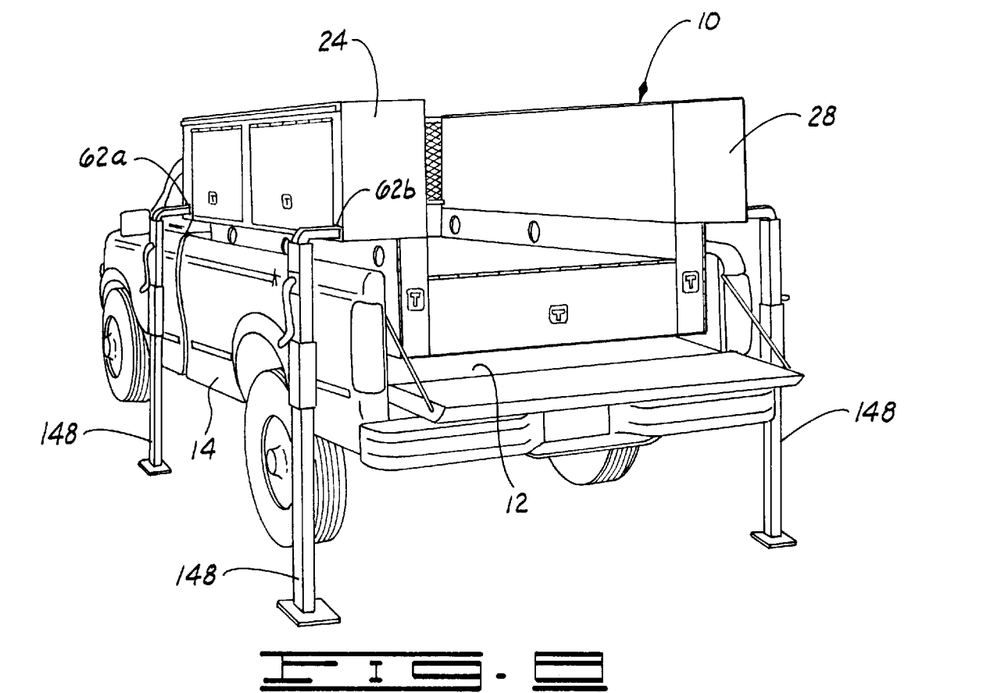
FIG. 8 is a perspective view of the storage unit of the present invention shown suspended above the cargo bed of a pickup truck by a plurality of lifting jacks.

The storage unit 10 is constructed so that it is adapted to be positioned in the cargo bed 12 in several ways. First, a fork lift (not shown) may be utilized by inserting the forks of the fork lift in the fork receiving spaces 114 formed below the central drawer 32. It will be understood that the rear door 126 encloses the fork receiving spaces 114 when the rear door 126 is closed and therefore the rear door 126 must be secured in an open position before the forks of the fork lift are inserted into the fork receiving spaces 114. Alternatively, a crane (not shown) may be used by attaching a line to a mounting tube (not shown) inserted in the support tubes 62a and 62b of the upper cabinets 24 and 28 and in turn placing the storage unit 10 into the cargo bed 12 with the crane. Still yet, in a manner illustrated in FIG. 8, the storage unit 10 can be raised and lowered with a plurality of lifting jacks 148 which are adapted to be inserted into the support tubes 62a and 62b of the upper cabinets 24 and 28.

With the storage unit lowered into the cargo bed 12, the storage unit 10 is secured to the pickup truck 14 via the clamp assemblies 58. With reference to FIG. 7, each of the clamp assemblies 58 is positioned between the outer side panel 76 of the lower cabinets 26 and 30 and the side panel 18 of the pickup truck 14 via the access openings 90a–e. The clamp assemblies 58 are secured to the downward extending flange 136 by tightening the clamping bolt 142 with the bolt receiving holes 143 in the first clamp portion 138 aligned with a corresponding pair of the mounting slots 60 formed in the bottom panel 42 of the upper cabinets 24 or 28. With the clamp assembly 58 secured to the flange 136 of the pickup truck 14, a cover plate 150 which is provided with a pair of holes 152 (only one being shown in FIG. 7) is positioned over the mounting slots 60. The mounting bolts 144 are then inserted through the holes 152 of the cover plate 150 and the mounting slots 60 of the upper cabinet 24 or 28 and threadingly secured to the first clamp portion 138. This is repeated until each of the clamp assemblies 58 has been secured.

It will be appreciated that removal of the storage unit 10 is accomplished by removing the mounting bolts 144 from the clamp assemblies 58 and lifting the storage unit 10 from the pickup truck 14 via a fork lift, crane or the lifting jacks 148.

Some of the advantages of the storage unit 10 of the present invention are its flexibility, versatility, and adaptability. That is, there is no need to remove or modify the original cargo bed. Factory fuel lines, electrical wires, and bumpers are left untouched. Further, installation is quick and does not require the drilling of holes in the pickup truck or welding parts thereto. The storage unit 10 is configured to provide a significant amount of storage space while maintaining the full bed width and bed length of the pickup truck. The storage unit 10 is also capable of receiving many industry standard options such as ladder and material racks, roller tops, and a variety of compartment interiors. Finally, it will be appreciated that the storage unit 10 can be constructed to fit into any sized cargo bed.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A storage unit for a vehicle having a cargo bed defined by a floor and a plurality of side panels, each side panel having a top end and a downward extending flange, the storage unit comprising:

a first upper cabinet including a front end panel, a rear end panel, a top panel, a bottom panel, an inner side panel, and an outer side panel cooperating to define a first cabinet space, the first upper cabinet having a door opening for providing access to the first cabinet space and a cabinet door for selectively opening and closing the door opening, the first upper cabinet having a width;

a first lower cabinet including a front end panel, a rear end panel, a bottom panel, an inner side panel, and an outer side panel, the first lower cabinet connected to the bottom panel of the first upper cabinet such that the bottom panel of the first upper cabinet cooperates with the front end panel, the rear end panel, the bottom panel, the inner side panel, and the outer side panel of the first lower cabinet to define a second cabinet space, the first lower cabinet having a door opening for providing access to the second cabinet space and a cabinet door for selectively opening and closing the door opening, the first lower cabinet having a width less than the width of the first upper cabinet such that a portion of the bottom panel of the first upper cabinet is positionable on the top end of one of the side panels of the vehicle and the first lower cabinet is disposable within the cargo bed of the vehicle adjacent to the side panel;

a second upper cabinet including a front end panel, a rear end panel, a top panel, a bottom panel, an inner side panel, and an outer side panel cooperating to define a third cabinet space, the second upper cabinet having a door opening for providing access to the third cabinet space and a cabinet door for selectively opening and closing the door opening, the second upper cabinet having a width;

a second lower cabinet including a front end panel, a rear end panel, a bottom panel, an inner side panel, and an outer side panel, the second lower cabinet connected to the bottom panel of the second upper cabinet such that the bottom panel of the second upper cabinet cooperates with the front end panel, the rear end panel, the bottom panel, the inner side panel, and the outer side panel of the second lower cabinet to define a fourth cabinet space, the second lower cabinet having a door opening for providing access to the fourth cabinet space and a cabinet door for selectively opening and closing the door opening, the second lower cabinet having a width less than the width of the second upper cabinet such that a portion of the bottom panel of the second upper cabinet is positionable on the top end of the side panel of the vehicle opposite the side panel on which the first upper cabinet is positioned and the second lower cabinet is disposable within the cargo bed of the vehicle adjacent to the side panel;

a floor plate secured between the inner side panels of the first and second lower cabinets a distance above the bottom panels of the first and second lower cabinets so as to define a drawer receiving space beneath the floor plate; and a drawer slidably mounted in the drawer receiving space.

2. The storage unit of claim 1 wherein the length of the first and second upper cabinets, the first and second lower cabinets, the floor, and the drawer are dimensioned to extend substantially the length of the cargo bed of the vehicle.

3. The storage unit of claim 1 further comprising a pair of spaced apart fork receiving member longitudinally supported beneath the drawer, the fork receiving members defining a pair of fork receiving recesses.

4. The storage unit of claim 1 further comprising a plurality of support tubes formed in the first and second upper cabinets adapted to receive means for selectively raising and lowering the storage unit.

5. The storage unit of claim 1 further comprising a metal screen secured between the first and second upper cabinets adjacent the front end panels thereof.

6. The storage unit of claim 1 wherein the door opening of the first upper cabinet is provided in the outer side panel thereof, and wherein the door opening of the second upper cabinet is provided in the outer side panel thereof.

7. The storage unit of claim 1 wherein the door opening of the first lower cabinet is provided in the rear end panel thereof, and wherein the door opening of the second lower cabinet is provided in the rear end panel thereof.

8. A storage unit for a vehicle having a cargo bed defined by a floor and a plurality of side panels, each side panel having a top end and a downward extending flange, the storage unit comprising:

a first upper cabinet including a front end panel, a rear end panel, a top panel, a bottom panel, an inner side panel, and an outer side panel cooperating to define a first cabinet space, the first upper cabinet having a door opening for providing access to the first cabinet space and a cabinet door for selectively opening and closing the door opening, the first upper cabinet having a width;

a first lower cabinet including a front end panel, a rear end panel, a bottom panel, an inner side panel, and an outer side panel, the first lower cabinet connected to the bottom panel of the first upper cabinet such that the bottom panel of the first upper cabinet cooperates with the front end panel, the rear end panel, the bottom panel, the inner side panel, and the outer side panel of the first lower cabinet to define a second cabinet space, the first lower cabinet having a door opening for providing access to the second cabinet space and a cabinet door for selectively opening and closing the door opening, the first lower cabinet having a width less than the width of the first upper cabinet such that a portion of the bottom panel of the first upper cabinet is positionable on the top end of one of the side panels of the vehicle and the first lower cabinet is disposable within the cargo bed of the vehicle adjacent to the side panel;

a second upper cabinet including a front end panel, a rear end panel, a top panel, a bottom panel, an inner side panel, and an outer side panel cooperating to define a third cabinet space, the second upper cabinet having a door opening for providing access to the third cabinet space and a cabinet door for selectively opening and closing the door opening, the second upper cabinet having a width;

a second lower cabinet including a front end panel, a rear end panel, a bottom panel, an inner side panel, and an outer side panel, the second lower cabinet connected to the bottom panel of the second upper cabinet such that the bottom panel of the second upper cabinet cooperates with the front end panel, the rear end panel, the bottom panel, the inner side panel, and the outer side panel of the second lower cabinet to define a fourth cabinet space, the second lower cabinet having a door opening for providing access to the fourth cabinet space and a cabinet door for selectively opening and closing the door opening, the second lower cabinet having a width less than the width of the second upper cabinet such that a portion of the bottom panel of the second upper cabinet is positionable on the top end of the side panel of the vehicle opposite the side panel on which the first upper cabinet is positioned and the second lower cabinet is disposable within the cargo bed of the vehicle adjacent to the side panel;

a floor plate secured between the inner side panels of the first and second lower cabinets a distance above the bottom panels of the first and second lower cabinets so as to define a drawer receiving space beneath the floor plate;

a drawer slidably mounted in the drawer receiving space; and clamp means for removably connecting the first and second upper cabinets to the flange of the adjacent side panels of the vehicle such that the first and second upper cabinets, the first and second lower cabinets, and the drawer are removably secured to the vehicle without structurally altering the vehicle.

9. The storage unit of claim 8 wherein the first and second lower cabinets are each provided with a plurality of clamp means access openings, and wherein the clamp means are mounted to the bottom panel of the first and second upper cabinets in alignment with the clamp means access openings.

10. The storage unit of claim 8 wherein the length of the first and second upper cabinets, the first and second lower cabinets, the floor, and the drawer are dimensioned to extend substantially the length of the cargo bed of the vehicle.

11. The storage unit of claim 8 further comprising a pair of spaced apart fork receiving members longitudinally supported beneath the drawer, the fork receiving members defining a pair of fork receiving recesses.

12. The storage unit of claim 8 further comprising a plurality of support tubes formed in the first and second upper cabinets adapted to receive means for selectively raising and lowering the storage unit.

13. The storage unit of claim 8 further comprising a metal screen secured between the first and second upper cabinets adjacent the front end panels thereof.

14. The storage unit of claim 8 wherein the door opening of the first upper cabinet is provided in the outer side panel thereof, and wherein the door opening of the second upper cabinet is provided in the outer side panel thereof.

15. The storage unit of claim 8 wherein the door opening of the first lower cabinet is provided in the rear end panel thereof, and wherein the door opening of the second lower cabinet is provided in the rear end panel thereof.

16. A storage unit in combination with a vehicle having a cargo bed defined by a floor and a plurality of side panels, each side panel having a top and a downward extending flange, the storage unit comprising:

a first upper cabinet including a front end panel, a rear end panel, a top panel, a bottom panel, an inner side panel, and an outer side panel cooperating to define a first cabinet space, the first upper cabinet having a door opening for providing access to the first cabinet space and a cabinet door for selectively opening and closing the door opening, the first upper cabinet having a width;

a first lower cabinet including a front end panel, a rear end panel, a bottom panel, an inner side panel, and an outer side panel, the first lower cabinet connected to the bottom panel of the first upper cabinet such that the bottom panel of the first upper cabinet cooperates with the front end panel, the rear end panel, the bottom panel, the inner side panel, and the outer side panel of the first lower cabinet to define a second cabinet space, the first lower cabinet having a door opening for providing access to the second cabinet space and a cabinet door for selectively opening and closing the door opening, the first lower cabinet having a width less than the width of the first upper cabinet such that a portion of the bottom panel of the first upper cabinet is positioned on the top end of one of the side panels of the vehicle and the first lower cabinet is disposed within the cargo bed of the vehicle adjacent to the side panel;

a second upper cabinet including a front end panel, a rear end panel, a top panel, a bottom panel, an inner side panel, and an outer side panel cooperating to define a third cabinet space, the second upper cabinet having a door opening for providing access to the third cabinet space and a cabinet door for selectively opening and closing the door opening, the second upper cabinet having a width;

a second lower cabinet including a front end panel, a rear end panel, a bottom panel, an inner side panel, and an outer side panel, the second lower cabinet connected to the bottom panel of the second upper cabinet such that the bottom panel of the second upper cabinet cooperates with the front end panel, the rear end panel, the bottom panel, the inner side panel, and the outer side panel of the second lower cabinet to define a fourth cabinet space, the second lower cabinet having a door opening for providing access to the fourth cabinet space and a cabinet door for selectively opening and closing the door opening, the second lower cabinet having a width less than the width of the second upper cabinet such that a portion of the bottom panel of the second upper cabinet is positioned on the top end of the side panel of the vehicle opposite the side panel on which the first upper cabinet is positioned and the second lower cabinet is disposed within the cargo bed of the vehicle adjacent to the side panel;

a floor plate secured between the inner side panels of the first and second lower cabinets a distance above the bottom panels of the first and second lower cabinets so as to define a drawer receiving space beneath the floor plate;

a drawer slidably mounted in the drawer receiving space; and means for removably connecting the first and second upper cabinets to the flange of the adjacent side panels of the vehicle such that the first and second upper cabinets, the first and second lower cabinets, and the drawer are removably secured to the vehicle without structural alterations to the vehicle.

17. The storage unit of claim 16 wherein the first and second lower cabinets are each provided with a plurality of clamp means access openings, and wherein the clamp means are mounted to the bottom panel of the first and second upper cabinets in alignment with the clamp means access openings.

18. The storage unit of claim 16 wherein the length of the first and second upper cabinets, the first and second lower cabinets, the floor, and the drawer are dimensioned to extend substantially the length of the cargo bed of the vehicle.

19. The storage unit of claim 16 further comprising a pair of spaced apart fork lift tubes longitudinally supported beneath the drawer, the fork lift tubes defining a pair of fork receiving recesses.

20. The storage unit of claim 16 further comprising a plurality of support tubes formed in the first and second upper cabinets adapted to receive means for selectively raising and lowering the storage unit.

21. The storage unit of claim 16 further comprising a metal screen secured between the first and second upper cabinets adjacent the front end panels thereof.

22. The storage unit of claim 16 wherein the door opening of the first upper cabinet is provided in the outer side panel thereof, and wherein the door opening of the second upper cabinet is provided in the outer side panel thereof.

23. The storage unit of claim 22 wherein the door opening of the first lower cabinet is provided in the rear end panel thereof, and wherein the door opening of the second lower cabinet is provided in the rear end panel thereof.

* * * * *